May 23, 1933. J. EATON 1,910,204
ELEVATOR SYSTEM
Filed July 28, 1931
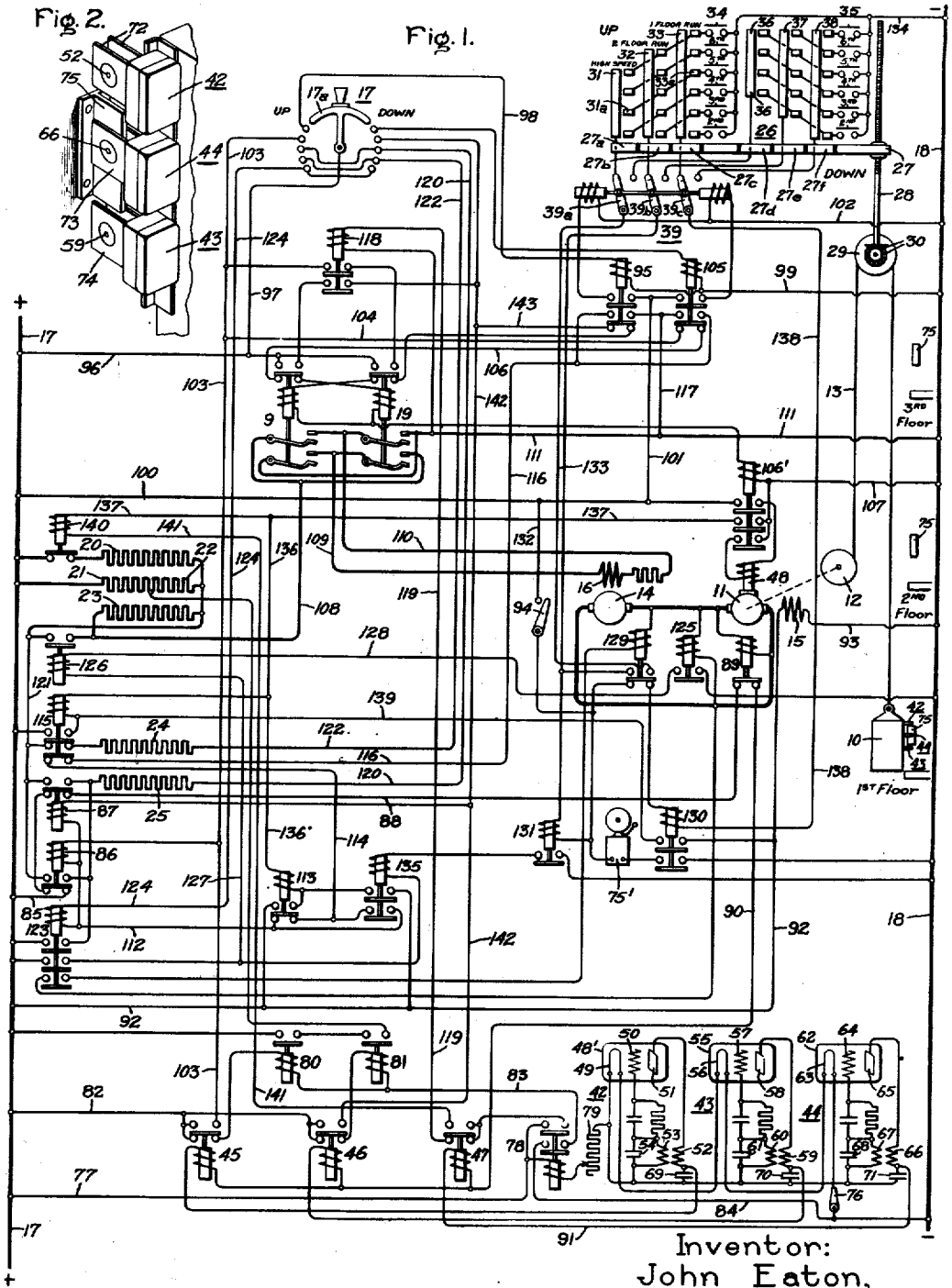
Inventor:
John Eaton,
by Charles E. Fullar.
His Attorney.

Patented May 23, 1933

1,910,204

UNITED STATES PATENT OFFICE

JOHN EATON, OF SCHENECTADY, NEW YORK, ASSIGNOR TO GENERAL ELECTRIC COMPANY, A CORPORATION OF NEW YORK

ELEVATOR SYSTEM

Application filed July 28, 1931. Serial No. 553,605.

This invention relates to control systems, more particularly to control systems for electric elevators, and it has for an object the provision of a simple, a reliable and an efficient system of this kind.

In one of its aspects, this invention relates to elevator control systems in which electric discharge devices are utilized as described and claimed in an application for Letters Patent Serial No. 295,059—Walter O. Lum, filed July 24, 1928, and assigned to the same assignee as the present invention. The Lum invention was made prior to my invention and I do not herein claim anything described in the said Lum application which, with respect to this application, is to be regarded as prior art. In the Lum system, a single electric discharge device is employed to control the operation of the traction motor so as to bring the car to rest level with a desired landing. Although the Lum system is entirely operative and successful, it leaves something to be desired, especially in the realm of the high speed operation required in modern passenger elevator service.

Accordingly a further object of the present invention is the improvement of the above-mentioned system disclosed in the above mentioned application.

This invention also relates to car switch controlled pre-registered signal elevator systems in which the car is automatically leveled at the floors. In modern passenger elevator service, the maximum speeds may be so high that due to the necessity of co-ordinating the signals for stops to be made both from high and low speed by operators of differing speeds of mental response, some operators do not have sufficient opportunity after a signal has been given for a stop from high speed, to center the car switch handle in sufficient time to enable the car to be stopped and leveled at the floor for which the signal was registered. Accordingly, a further object of this invention is the provision of means for automatically initiating deceleration of the traction motor in response to a signal, while the car switch handle is in the running position and when the car is a predetermined distance away from a floor for which the signal was registered and for giving the operator a signal to center the car switch handle, which signal may be either visual, audible or the sensation of losing speed experienced when the deceleration is initiated, together with electrical connections requiring the operation of the car switch handle to the off position in order to provide for the automatic leveling operation.

A further and more specific object of the invention is to provide up and down leveling control circuits in which separate electric discharge devices are employed to effect and control the respective up and down leveling operations.

An additional object of the invention is the provision of a control system in which a separate electric discharge device is employed to control the reduction of the motor speed to a predetermined low leveling speed prior to the stopping control operation of the up and down leveling discharge devices and irrespectively of the direction of the car from the desired landing.

Still more specifically an object of the invention is the provision of a plurality of separate control devices respectively associated with and connected to control the several electric discharge devices, and the arrangement of these control devices so as to provide for their actuation by a single controlling element; provision also being made for effecting relative movement between the single controlling element and the control devices in accordance with the movement of the elevator car.

Additional objects will manifest themselves from a consideration of the drawing and the following specification.

In carrying this invention into effect in one form thereof, a suitable traction motor is employed to raise and lower the car and the leveling of the car at a desired landing is accomplished by means of an electric discharge device which functions to control the reduction of the motor speed to a predetermined low value when the car is a predetermined distance from the landing and to stop the motor when the car is level with the landing whilst a second electric discharge device functions in the interval between the slow speed and stopping operations of the first electric discharge device to further reduce the speed of the motor to a predetermined low leveling speed.

A manually operated car switch serves to start the motor in the desired direction and in order to insure the most economical run of the car, a contact device more specifically a signal registering machine, actuated by push buttons arranged at the several landings or in the car, serves to initiate deceleration of the motor to a leveling speed when the car is a predetermined distance from the landing, and a pair of electric discharge devices selectively energized in accordance with the direction of the car from the landing serve to reduce the speed of the motor to a low value as the car approaches to within a given distance of the landing and to stop the motor when the car is level with the landing after an additional electric discharge device has functioned when the car is very close to the landing and irrespectively of its direction therefrom, to reduce the speed of the motor to a predetermined low leveling speed. After deceleration of the motor has been initiated, a signal which may be either visual, audible or the sensation of losing speed due to the deceleration, is given to the operator to actuate the car switch handle to the "off" position and electrical connections are provided that require the operation of the car switch to the off position in order to render the leveling apparatus effective to initiate the leveling operation and in the event that the operator does not center the car switch in response to the admonition of the signal, the traction motor will remain energized and will continue to drive the car through the leveling zone and past the landing at low speed. This is an important safety feature because it requires alertness on the part of the operator and since his cooperation is necessary to effect a stop, insures in so far as it is possible to do so, that the operator devote his attention at all times to the control of the car instead of relying entirely upon the automatic operation of the apparatus itself.

Although the "off" position to which the car switch handle must be operated in order to render the leveling apparatus effective is illustrated and described as the central position, it will of course be understood that this position is not necessarily the central position. The car switch elements may be so arranged that the leveling operation is initiated upon actuation of the car switch to any desired position other than the running positions, for example to a position beyond the running positions; and in the following specification and claims reference to the off position of the car switch will be understood to mean a leveling position and to include any position other than the running positions.

In illustrating the invention in one form thereof, I have shown it as embodied in a passenger elevator system in which the car is driven by an electric traction motor supplied from a separate generator, the voltage of which is varied by means of a car switch and resistances in the generator field circuit and under the control of the car switch.

For a better and more complete understanding of the invention, reference should now be had to the following specification and to the accompanying drawing in which Fig. 1 is a simple partially "across the line" diagrammatical illustration of an embodiment of the invention in an elevator system, and Fig. 2 is a detail illustrating the arrangement and location of the leveling control units.

Referring now to the drawing, a passenger elevator car 10 is raised and lowered by any suitable driving means such for example as the electric motor 11 to the drive shaft of which is keyed a suitable winding drum 12 and to which the car 10 is connected by means of the cable 13, which is adapted to be wound upon or unwound from the winding drum 12 in response to rotation of the motor 11. As shown, the motor 11 is of the direct current type, it being provided with an armature member which is supplied in Ward-Leonard connection from a suitable variable voltage generator 14, and with a separately excited field winding 15. The generator 14 is driven at a speed, which is preferably substantially constant, by any suitable driving means such for example as an alternating current synchronous motor (not shown) which in turn is supplied from any suitable source. The generator 14 is provided with a separately excited field winding 16 and this field winding as well as the field winding 15 of the traction motor are excited from any suitable source of direct current power such for example as that represented by the positive supply line 17 and the negative supply line 18.

As previously pointed out, the armature of the motor 11 is connected in Ward-Leonard fashion to the armature of the generator 14, i. e., the armatures of the motor 11 and generator 14 are connected together in a closed loop and as will be well understood by persons skilled in the art, the speed and direction of rotation of the motor 11 will depend upon the magnitude and direction of the voltage of the generator 14 as determined by the degree of excitation and the direction of current flow in the field winding 16 of the generator. As shown in the drawing the degree and direction of the excitation of the generator field 15 is under the control of a suitable switching device, illustrated in the drawing as a manually operated multi-position speed governing controller 17 which is located in the car 10 accessible to the operator and which will hereinafter be referred to as the car switch. The down and up directional contactors 9 and 19 respectively serve when either is actuated to the closed position under the control of the car switch 17 to connect the field winding 16 of the generator to the supply source 17, 18 so as to effect rotation of the motor 11 in such a direction that the car 10 will be lowered when the down directional contactor 9 is closed and will be raised when the up directional contactor 19 is closed.

The resistance sections 20 to 25 inclusive serve to control the degree of excitation of the generator field winding 16 under the control of the car switch 17, i. e., when the car switch 17 is actuated to its full speed running position in either direction from the central or neutral position in which it is shown, successive sections of the accelerating resistance are added in parallel to each other and finally short-circuited, as a result of which the voltage of generator 14 is increased from a low value to its full value and the speed of the traction motor 11 is accelerated in conformity with the increase of the generator voltage.

In order to initiate deceleration of the traction motor 11 so as to bring the car 10 to rest at a desired landing a signal registering machine 26 cooperates with certain control relays and contactors to remove the short circuit from about the resistances 20 to 25 inclusive and to increase the value of the resistance in the generator field 16 so as to decrease the generated voltage thereof and to reduce the speed of the motor 11 to a predetermined low value. As shown, this signal machine comprises a movable member 27 which is moved in an upwardly or downwardly direction in accordance with the movement of the elevator car 10 by means of a threaded screw 28 and a pulley 29 about which several turns of the hoisting cable 13 are wound and to which the screw 28 is connected by means of the bevel reduction gearing 30. The signal registering machine 26 is divided into groups of vertical contact segments and individual cooperating contact devices; the left hand group controlling the initiation of deceleration of the traction motor 11 when the car is traveling in the up direction and the right hand group serving to intiate the deceleration of the motor when the car is traveling in the down direction. As shown, the left hand group comprises vertical contact segements 31, 32, and 33 together with a separate row of cooperating individual contacts respectively associated with each of the vertical segments. The movable contact member 27 is divided into a plurality of separate contact sections $27_a$ to $27_f$ inclusive, which as indicated in the drawing are insulated from each other. A row of contact devices 34, one device per floor, is associated with the segment 33 adjacent to its row of separate contacts. Each of the row of contact devices 34 comprises a movable contact member and a pair of cooperating stationary contact members. The movable contact members 34 are actuated into engagement with their cooperating stationary contacts by means of relays which in turn are controlled by manually operated push buttons located either in the car 10 for operation by the operator, or by push buttons located at the landings which are operated by passengers who desire to stop the car at the floor at which they are then located.

Since the manually operated push buttons, and the relays controlled thereby which in turn control the operation of the movable contact members 34 are well understood by persons skilled in the art, they have been omitted from the drawing since it is believed that a showing of these elements would tend to confuse rather than to clarify the explanation. The movable contact members 34 may themselves be considered the movable members of the push buttons and it will be seen that when one of these movable members is actuated into engagement with its corresponding cooperating stationary contacts a control circuit is partially completed from the negative side of the line 18 to one of each of the rows of separate contact members associated with the segments 31, 32 and 33. It will be seen that the separate contacts associated with the vertical segments 31, 32 and 33 are connected together in groups by staggered connections so that when the car is traveling at high speed and a push button has been pressed to bring the car to rest at a desired landing the section $27_a$ will cooperate with the vertical segment 31 and the separate contact which corresponds to the depressed push button to initiate deceleration of traction motor 11 at the proper point in the travel of the car and when the car 10 is at rest at a floor and a push button has been depressed to bring the car to rest at a landing two floors above that at which the car is standing the section $27_b$ will cooperate with the vertical segment 32 and the separate contact corresponding to the depressed push button to initiate deceleration of the traction motor 11 when the car is at a somewhat less distance from the desired floor, whilst when a push button has been depressed to stop the car at a landing one floor above that at which the car is at rest the section $27_c$ will cooperate with the vertical segment 33 and the separate contact corresponding to the depressed push button to initiate deceleration of the motor 11 when the car is but a very short distance from the desired landing.

The right hand or down section of the signal registering machine 26 is similar to the left hand or up section and in this connection the row of contact devices 35 may be considered as the push buttons located either in the car 10 or at the separate landings. The vertical contact segment 36 and its adjacent row of separate contacts cooperates with the section $27_d$ to initiate deceleration of the motor when traveling at high speed, the vertical section 37 and its adjacent row of separate contacts cooperate with the section $27_e$ to initiate deceleration of the traction motor 11 for a two floor run and the vertical segment 38 and its adjacent row of separate contacts cooperate with the section $27_f$ to initiate deceleration of the motor 11 for a one floor run. The separate contacts associated with the vertical segments 36, 37 and 38 are grouped and connected in staggered relationship in a similar but inverse manner to that described in connection with the left hand or up section of the signal registering machine. It will thus be seen that the staggered connections of the separate contacts associated with the vertical segments provide for initiation of deceleration of the traction motor 11 at a point in the travel of the car with respect to a desired landing which is dependent upon the instantaneous speed of the motor 11 or the maximum speed of the motor which is permissible in order to stop the car at a desired landing when the landing is either one or two floors away from a landing at which the car may be standing.

Operation of the signal registering machine 26 to initiate deceleration of the traction motor 11 is transferred from the up to the down side of the signal machine and vice versa by means of a transfer switch 39, the operation of which in turn is controlled by means of suitable electroresponsive devices shown in the drawing as control relays 95 and 105 respectively, the operation of which in turn is controlled by the car switch 17. When the transfer switch is in the position in which it is illustrated, its separate blades $39_a$, $39_b$ and $39_c$ are respectively connected to the vertical segments 31, 32 and 33 of the up section of the signal registering machine, whilst when the transfer switch 39 is operated to the right hand position, its blades $39_a$, $39_b$ and $39_c$ are respectively connected to the vertical segments 36, 37 and 38 on the down side of the signal registering machine.

After the signal registering machine 26 has functioned to initiate deceleration of the traction motor 11 in response to depression of a push button located either in the car 10 or at a landing, suitable electric discharge apparatus shown as comprising three separate electric discharge units 42, 43 and 44 and suitable electroresponsive devices shown as comprising the three relays 45, 46 and 47 respectively controlled by electric discharge units 42, 43 and 44 serve to reduce the speed of the traction motor 11 to a first and second low leveling speeds when the car 10 is at predetermined distances from the desired landing and to continue the operation of the motor 11 at the second reduced leveling speed until the car reaches the landing and finally to stop the motor 11 and apply the mechanical brake 48 when the car 10 is exactly level with the desired landing.

The leveling unit 42 which controls the leveling operation when the car is traveling in the up direction comprises an electric discharge device 48′ preferably of the three-electrode type; it being provided as shown with a filamentary cathode 49, a grid 50 and an anode or plate 51 together with a coil 52 connected in the plate or output circuit and a coil 53 shunted by a condenser 54 in the grid or input circuit and arranged in inductive relationship with coil 52.

Unit 43 controls the leveling operation of the traction motor when the car 10 is traveling in a down direction, and this unit similarly comprises an electric discharge device 55 similarly provided with filament, grid and plate 56, 57 and 58 respectively, coils 59 and 60 being arranged in inductive relationship with each other and respectively connected in the output and input circuits of the electric discharge device, the coil 60 being shunted by a condenser 61. After the speed of the traction motor 11 has been reduced to a predetermined low leveling speed by means of one or the other of the leveling units 42 or 43 and prior to the arrival of the car 10 level with the desired landing the low speed leveling unit 44 functions to further reduce the speed of the motor 11 to a second predetermined low leveling speed irrespectively of the direction in which the car 10 is traveling. This unit likewise comprises an electric discharge device of the three electrode type, it being provided as shown with filament, grid and plate 63, 64 and 65 respectively together with coils 66 and 67 arranged in inductive relationship with each other and respectively connected in the output and input circuits of the electric discharge device 62 and as shown the coil 67 is shunted by a condenser 68.

It will be observed that the energizing circuits, i. e., the operating coils of the up and down leveling control relays 45 and 46 are respectively connected in the plate or output circuits of the up and down electric discharge devices 48′ and 55, whilst the operating coil of the low speed leveling relay 47 is connected in the output circuit of electric discharge device 62.

Persons skilled in the art will understand that if coils are respectively connected in the plate and grid circuits of an electric discharge device and arranged in inductive relationship with each other and if the coil in the grid circuit is suitably tuned by a capacitance, the current in the output circuit of the device will oscillate at a frequency determined by the electrical constants of the circuits themselves. In the system illustrated in the drawing, the coils in the plate and grid circuits of the electric discharge devices and the condensers in the grid circuits thereof are so designed that the current in the output circuit of these devices oscillates at a frequency of approximately 200 kilocycles. Inasmuch as a couple, i. e., an inductive relationship between the coils in the grid and plate circuits is essential to the condition of oscillation it will be clear that breaking or interrupting this inductive relationship will stop the oscillation. In an oscillating circuit of this type a very considerable change in plate current occurs when the circuit changes from the oscillating to the non-oscillating condition or vice versa. The plate current will be low when the circuit is oscillating and high when the oscillation ceases. As previously pointed out, the operating coils of the up and down leveling relays 45 and 46 and the low speed leveling relay 47 are respectively connected in the plate circuits of the electric discharge devices 48', 55 and 62. These coils are respectively by-passed by condensers 69, 70 and 71 which serve to increase the difference in plate current through the operating coil of the relays when the condition of the electric discharge devices changes from oscillating to non-oscillating or vice versa because the highly inductive relay coil will not pass radio frequency current but the condenser in parallel therewith will and during the non-oscillating condition of the electric discharge device the condenser will pass no direct current but the operating coil of the relay will freely pass the direct current. Thus it will be seen that when an inductive relationship exists between the plate circuit and grid circuit coils of the electric discharge devices 48', 55 and 62 the operating coils of the relays 45, 46 and 47 will be deenergized and the relays will occupy the position in which they are illustrated in the drawing, whilst when the inductive relationship between the plate and grid circuit coils of the electric discharge devices is interrupted the operating coils of relays 45, 46 and 47 will be energized and the relays will be operated to their upper position.

In order to interrupt the inductive relationship of the grid and plate circuit coils of the electric discharge devices 48', 55 and 62 without contacts of any kind, the grid and plate circuit coils of each of these devices are spaced apart from each other so that a metallic vane inserted between the two coils will interrupt their inductive relationship and stop the oscillation, thereby energizing the relay operating coil which is connected in circuit therewith.

As indicated in Fig. 2 of the drawing the electric discharge devices of the leveling units 42, 43 and 44 are housed in metal casings each mounted in a suitable position upon the frame of the elevator car, preferably upon the cross-head of the frame and in a position near the wall of the elevator shaft. The grid and plate circuit coils of the electric discharge devices of the several units are respectively mounted in a pair of wooden supports which project rearwardly from these metallic housings; and as shown in the drawing the pair of coils 52, 53 are respectively carried in the supporting members 72, the pair of coils 66, 67 are carried in the supports 73 and the pair of coils 59, 60 are carried in supports 74.

It will be observed that the members of each of these pairs of supports are spaced apart from each other sufficiently to provide for the passage of a metallic vane therebetween, so as to interrupt the inductive relationship between the pair of coils carried in these supports.

In order that but a single metallic vane member 75 may be employed to control the inductive relationship between the grid and plate circuit coils of the respective pairs, the leveling units 42, 43 and 44 are arranged in vertical alignment upon the cross-head of the elevator car with the up and down leveling units 42 and 43 arranged in spaced apart relationship such that when the car 10 is level with the landing at which the metallic vane member 75 is located, the respective pairs of coils for these units will be located above and below the vane respectively so that the inductive relationship between the pairs of coils of these two leveling units will not be interrupted by the metallic vane member 75, whilst the vane will be between the coils 66 and 67 of the low speed leveling unit 44 and the inductive relationship between this pair of coils will be interrupted. Thus it will be seen that when the car 10 is level with a landing a highly oscillating current will flow in the plate circuits of the electric discharge devices 48' and 55 and the operating coils of the up and down leveling relays 45 and 46 which are respectively connected in these plate circuits will consequently be deenergized whilst a direct current will flow in the plate circuit of the electric discharge device 62 due to the interruption of the inductive relationship between the coils 66 and 67 by the metallic vane member 75 and as a result the operating coil of the low speed leveling relay 47 will be energized and the relay will be operated to its upper position.

As previously mentioned, electrical connections have been provided that require that the operator actuate the car switch 17 to its central or off position in order to render the electric discharge apparatus and the electroresponsive devices controlled thereby effective to control the traction motor 11 to level the car at a desired landing after deceleration has been initiated by the signal registering machine 26 and a suitable warning signal, such for example as the single stroke gong 75' or a visual signal controlled by the signal machine 26 admonishes the operator to center the car switch 17 at the proper time.

With the above understanding of the apparatus and elements and their organization and connections in the system, the operation of the system itself will readily be understood from the detailed description which follows:

Assuming the car 10 to be standing at the first floor as indicated in the drawing and the leveling cut-out switch 76 in the closed position, the filaments of electric discharge devices 48', 55 and 62 are connected in series to the supply source 17, 18 and heated to incandescence, the circuit being traced from the positive side 17 of the supply source by conductor 77, to and through the coil of leveling protective relay 78, variable protective resistance 79, filaments 49, 56 and 63 in series leveling cut-out switch 76 to the opposite side 18 of the supply source. Leveling protective relay 78 is operated to the upper or closed position in response to the energization of its operating coil and in its closed position, its lower contact completes an energizing circuit for the operating coil of leveling contactors 80 and 81; these circuits being respectively traced from the positive side 17 of the supply source, through conductor 82, in parallel through lower contacts of up and down leveling relays 45 and 46, through operating coils of leveling contactors 80 and 81 in parallel, conductor 83, lower contact of leveling protective relay 78 (in the closed position) and thence by conductor 84 to the opposite side 18 of the supply source. Contactors 80 and 81 are closed in response to the energization of their operating coils and in the closed position these two contactors complete a short circuit about section 21 of the accelerating resistance. Since the metallic vane member 75 adjacent the floor at which the car is standing is between the coils 66 and 67, the inductive relationship between these coils is interrupted and a direct current flows in the plate circuit of electric discharge device 62 which energizes the operating winding of low speed leveling relay 47; the circuit being traced from the positive side 17 of the supply source through the conductor 85, lower auxiliary contact of accelerating contactor 86, lower contact of accelerating contactor 87, conductor 88, contacts of counter E. M. F. relay 89, conductor 90, coil of relay 47, conductor 91, anode 65 and cathode 63 of electric discharge device 62 and thence by conductor 84 to the opposite side 18 of the supply source.

The shunt field winding 15 of the traction motor 11 is continuously energized across the supply source 17, 18 to which its terminals are respectively connected by means of the conductors 92 and 93. The automatic stop cut-off switch 94 is actuated to the closed position and the apparatus is now in its normal or prestarting condition. Switch 94 in its closed position insures the operation of the signal machine 26 to initiate automatic deceleration of the traction motor 11 and leveling cut-out switch 76 in its closed position renders the electric discharge apparatus effective to control the leveling operation of the car.

As the passengers enter the car they announce to the operator the number of the floor at which they desire to leave the car and the operator depresses a push button corresponding to the floor announced by the passengers. As an example, let it be assumed that a passenger announces that he desires to leave the car at the fifth floor. The operator will depress button number five and as a result the fifth contact of the row of contacts 34 on the up side of the signalling machine 26 is operated to the closed position. Corresponding contacts of the row 34 are closed in response to the depression of other push buttons corresponding to floors announced by passengers entering the car. Similarly, buttons depressed by passengers awaiting at floors and desiring to travel in the up direction cause contacts of the row of contacts 34 on the signal machine corresponding to the floors at which the buttons are depressed to be operated to the closed positions.

Assuming now that the car is loaded to capacity, the car doors are closed and the car switch 17 is operated from the central or off position in which it is illustrated in a counter clockwise direction to the full speed position in which the movable segment 17$_a$ of the car switch engages all of the left hand stationary contacts with which it cooperates. On the first point of the car switch an energizing circuit for the special reversing control relay 95 is established, which energizing circuit is traced from the positive side 17 of the supply source through conductors 96 and 97, segment 17$_a$ of car switch, first point of car switch, conductor 98, operating coil of relay 95, conductor 99 to the negative side 18 of the supply source.

Relay 95 in responding to the energization of its operating coil moves to the upper or closed position in which its upper contact completes an energizing circuit for the left hand solenoid of the transfer switch 39. This energizing circuit is traced from the positive side 17 of the supply source, through conductors 100 and 101, upper contact of relay 95, left-hand operating coil of transfer switch 39 and thence by conductor 102 to the negative side 18 of the supply source. Transfer switch 39 which was previously in its right hand position during the last down travel of the car is now operated to the left hand position in which it is shown.

On the second point of the car switch the up-directional contactor 19 is closed due to the energization of its operating coil over a circuit that is traced from the positive side 17 of the supply source to segment 17ₐ of the car switch as before, thence through second point of car switch, conductors 103 and 104, lower contact of special control relay 105 (in its open position), conductor 106, interlock on down contactor 9, operating coil of up contactor 19, operating coil of solenoid brake relay 106' and thence by conductor 107 to the negative side 18 of the supply source. In its closed position the up contactor 19 connects the field winding 16 of the generator 14 to the supply source and certain sections of the accelerating resistance in circuit therewith; the field circuit being traced from the positive side 17 of the supply source through resistance sections 20 and 22 in parallel and thence in series through resistance section 23, conductor 108, lower contact of up directional contactor 19, conductor 109, field winding 16, conductor 110, upper contact of up directional contactor 19 and thence by conductor 111 to the negative side 18 of the supply source.

Brake relay 106' in responding to the energization of its operating coil moves to the upper or closed position in which it completes an energizing circuit for the winding of solenoid brake 48 extending from the positive side 17 of the supply source, through conductor 100, upper contacts of brake relay 106', solenoid winding of solenoid brake 48, lower contacts of brake relay 106' and thence by conductor 107 to the negative side 18 of the supply source. The energization of the brake solenoid acts against the tension of the brake spring (not shown) to release the brake shoe from the brake, drum, and the generator 14 due to the low excitation of its field winding 16 develops a low voltage which causes the traction motor 11 to start the car 10 at a low speed and in the up direction.

The accelerating contactor 86 is also closed on the second point of the car switch due to the energization of its operating coil over a circuit that is traced from the second point of the car switch, through conductor 103, operating coil of relay 86, conductor 112, lower contact of relay 113 (in the closed position), conductor 114, lower contact of contactor 115 (in the closed position), conductor 116, intermediate contact of relay 95, (previously closed), conductors 117 and 111 to the negative side 18 of the supply source. In its closed position contactor 86 opens its lower auxiliary contacts through which the energizing circuit of low speed leveling relay 47 was traced and as a result the latter relay drops to its deenergized position in which it is shown in the drawing.

Relay 47 in opening establishes an energizing circuit for a special control relay 118 which circuit is traced from the positive side 17 of the supply source through conductor 77, upper contact of relay 78, lower contact of relay 47, conductor 119, operating coil of relay 118, and thence by conductor 111 to the negative side 18 of the supply source; and relay 118 in responding to the energization of its coil moves to its closed position in which it establishes a holding circuit for the operating coil of up directional contactor 19 independently of the car switch 17, which holding circuit may be traced from side 17 of the supply source, through conductor 96, interlock of up directional contactor 19 (in the closed position), upper contact of relay 118, conductor 103, and thence through the operating coil of the directional contactor 19 over the circuit previously traced to the side 18 of the supply source.

On the third point of the car switch the accelerating resistance section 25 is added in parallel with the sections 20 and 22 over the following circuits from the positive side 17 of the supply source through segment 17ₐ and third point of the car switch, conductor 120, resistance section 25, upper contact of accelerating contactor 86, conductor 121 to the common point of the resistance sections 20, 22 and 23, and as a result the voltage of the generator 14 is increased and the speed of the traction motor 11 is correspondingly increased.

The resistance section 24 is added in parallel with resistance sections 20, 22 and 23 on the fourth point of the car switch; the circuit being traced from the fourth point of the car switch, through conductor 122, resistance section 24, intermediate contact of accelerating contactor 115 and thence by conductor 121 to the common point of resistance sections 20, 22, 23 and 25, and as a result the generator voltage and speed of the traction motor 11 is further increased.

On the fifth point of the car switch the accelerating contactor 123 is energized and closed over a circuit extending from the fifth point of the car switch through conductor 124, operating coil of contactor 123, conductor 112 and thence by way of the circuit previously traced for relay 86 to the negative side 18 of the supply source.

In the closed position, the upper contact of accelerating contactor 123 connects the common point of the resistance sections to the positive side of the supply source thereby short-circuiting resistance sections 20, 22, 24 and 25 to further increase the speed of the traction motor 11; and when the latter has accelerated to a predetermined speed, counter E. M. F. relay 125 is energized by the counter E. M. F. of the traction motor and is operated to the closed position in which it establishes an energizing circuit for accelerating contactor 126 that extends from the positive side of the supply source 17 through intermediate contacts of accelerating contactor 123, conductor 127, operating coil of contactor 126, conductor 128, contacts of C. E. M. F. relay 125 and thence to the negative side 18 of the supply source. Accelerating contactor 126 in responding to the energization of its operating coil moves to its upper or closed position in which it short-circuits the final resistance sections 23 and the generator field 16 is now connected directly across the line so that the generator develops full rated voltage and the speed of the traction motor 11 is accelerated to full value.

When the car is a short distance away from the floor which it has just left, the counter voltage of the traction motor is sufficient to energize C. E. M. F. relay 129, the energizing circuit of which may be traced from one motor armature terminal to the other with the lower auxiliary contact of accelerating contactor 123 in circuit therewith. Relay 129 in closing interrupts the energizing circuit of relay 130 so that the latter cannot be controlled by contacts of the signal machine 26 corresponding to floors less than two floors away from the instantaneous floor position of the car. At the same time, relay 129 partially establishes an energizing circuit for relay 131 which can be completed through the signal machine by contacts which control the stopping of the car at floors more than two floors beyond the instantaneous car position.

Similarly, C. E. M. F. relay 89 is energized and operated to the open position when the speed of the traction motor 11 is accelerated to a predetermined value and in its open position this relay interrupts the energizing circuit of the leveling control relays 45, 46 and 47 (which were previously interrupted when the accelerating contactor 86 was operated to the closed position). As a result of this further interruption of the energizing circuits for these relays, it will be clear that the leveling operation cannot be initiated until the speed of the traction motor has been reduced to a predetermined low value.

Assuming now that the first floor for which a signal has been registered to stop the car is the fifth floor, the contact section $27_a$ will bridge the vertical contact segment 31 and the separate cooperating contact $31_a$ when the car is a predetermined distance from the fifth floor, e. g., the separate contactor $31_a$ is so positioned that it will be engaged by the movable contact segment $27_a$ when the car is about at the third floor. At this point the car is traveling at a high speed of from 700 to 800 feet a minute. When the contact segment $27_a$ bridges segment 31 and contact $31_a$ it completes an energizing circuit for relay 131 which is placed from the positive side 17 of the supply source over conductors 100 and 132, automatic stop cut-out switch 94, coil of relay 131, upper contacts of relay 129 (previously closed), conductor 133, switch blade $39_a$ of the transfer switch, segment 31, contact section $27_a$ and contact $31_a$ of the signal machine, fifth contact of row 34 (previously closed by operator or by prospective passenger at fifth floor) and thence by conductor 134 to the negative side 18 of the supply source.

Relay 131 in responding the energization of its operating coil moves to its closed position in which it establishes an energizing circuit for relay 135, which circuit is readily traced across the supply source 17, 18 through the intermediate contact of the accelerating contactor 123 in the closed position. In response to energization, relay 135 closes to complete a circuit in parallel with the lower contact of relay 113, thereby maintaining accelerating contactors 86 and 123 energized for the time being, and the upper contact of relay 135 completes an energizing circuit for relay 113 which extends from the positive side 17 of the supply source, through conductor 92, upper contact of relay 135, coil of relay 113, conductor 136, conductor 137, intermediate contact of solenoid brake relay 106', and thence by conductor 107 to the negative side 18 of the supply source. As a result of its energization, the relay 113 moves to the upper position in which it interrupts the energizing circuits for accelerating contactors 86 and 123 which were previously traced through its lower contacts; but, as previously pointed out, these accelerating contactors remain held up through the lower contact of relay 135.

As the car 10 continues on, the contact segment $27_a$ passes out of engagement with contact $31_a$ thereby to interrupt the energizing circuit for relay 131 which in descending to its open position interrupts the energizing circuit for relay 135 which was previously traced through its contact in the closed position. Responsively to its deenergization, relay 135 likewise drops to the open position in which it interrupts the energizing circuit for accelerating contactors 86 and 123, which circuits were maintained closed through the lower contact of relay 135 after the deenergization of the relay 113.

Accelerating contactor 123 is opened in response to the interruption of its energizing circuit and in its open position the short circuit about resistance sections 20, 22, 24 and 25 previously traced through its upper contact is removed and as a consequence the excitation of the generator 14 is slightly decreased and its generated voltage and the speed of the traction motor 11 are correspondingly decreased. The contactor 86 likewise opens responsively to the deenergization of its operating coil and in its open position it disconnects resistance sections 25 from in parallel with resistance sections 20, 22 and 24; as a result of which the speed of the traction motor is further decelerated.

In the open position of accelerating contactor 123 its intermediate contact interrupts the energizing circuit for contactor 126 which drops to its open position responsively to the deenergization of its operating coil and in its open position contactor 126 removes the short circuit from about resistance section 23 further decreasing the speed of the traction motor 11.

In its open position, the lower contact of contactor 123 interrupts the energizing circuit of relay 129 which responsively to the deenergization of its operating coil drops to its lower position in which it partially completes an energizing circuit for relay 130, which energizing circuit extends from the positive side 17 of the supply source through conductors 100 and 132, automatic stop cut-off switch 94, lower contact of relay 129 (in the open position of the relay), coil of relay 130, conductor 138, blade $39_c$ of transfer switch 39 as far as and including segment 33 of signal machine 26. When the car 10 is a predetermined distance from the desired landing i. e., at some point between the fourth and fifth floors in the example assumed, the contact section $27_c$ bridges the vertical segment 33 and the cooperating contacts $33_a$ complete an energizing circuit for relay 130 through the fifth floor contact of the row 34 and thence by conductor 134 to the negative side 18 of the supply source. Relay 130 closes in response to the energization of its operating coil and in its closed position its lower contact completes a circuit for the signal gong $75'$, which circuit is readily traceable from the positive side 17 of the supply source to the negative side 18 thereof.

Although the above described retarding operations have been described as taking place in sequence, it will of course be understood that these operations succeed each other so rapidly that they are almost simultaneous and it is to be noted that these retarding operations are initiated entirely independently of the operator and while the car switch handle is in the running position thus making it unnecessary to center the car switch handle in order to initiate the deceleration, and in fact the automatic initiation of deceleration cannot be prevented by the operator even though he maintains the car switch handle in the running position.

The sensation experienced by the operator as the car loses speed itself serves as a signal, augmented by the warning gong $75'$, admonishing him to operate the car switch handle to the "off" or "leveling" position, which operation as previously pointed out must be performed in order to render the electric discharge apparatus effective to control the leveling operation. The upper contact of the relay 130 in its closed position establishes an energizing circuit for the accelerating contactor 115; this circuit being traced from the positive side 17 of the supply source through conductor 92, upper contact of relay 130, conductor 139, coil of relay 115, conductors 136 and 137, intermediate contact of brake relay $106'$ and thence by conductor 107 to the negative side 18 of the supply source. Accelerating contactor 115 responsively to the energization of its operating coil, moves to its upper position in which its upper contact disconnects resistance section 24 from in parallel with resistance sections 20 and 22 thereby still further decreasing the excitation of the generator 14 which results in a corresponding reduction in the speed of the traction motor 11 and the upper contact of contactor 115 engages its upper stationary contact to complete a self holding circuit independently of the contacts of relay 130. This holding circuit is readily traceable from the positive side 17 of the supply source through the upper stationary contacts of contactor 115, coil of contactor 115 and thence by the circuit previously traced to the negative side 18 of the supply source. In the central or off position of the car switch, the energizing circuit for the up directional contactor 19 which was previously traced through the second point of the car switch is interrupted but the contactor remains in the closed position due to the holding circuit for its operating coil that was established by the relay 118.

As the car continues onward, the contact section $27_c$ passes out of engagement with the separate contact $33_a$, the energizing circuit for the relay 130 is interrupted and the relay again descends to the lower or open position in which it is shown in the drawing, the contactor 115 remaining energized and in the closed position due to its holding circuit.

When the car 10 is a very short distance from the fifth floor, e. g., approximately twenty-nine inches, the plate and grid coils 52 and 53 of the up leveling electric discharge device 48' come into cooperative relationship with the metallic vane member 75, i. e., the vane 75 interrupts the inductive relationship between the coils 52 and 53 as a result of which the current in the plate circuit of electric discharge device 48' ceases to oscillate and becomes a direct current of sufficient magnitude to energize the up leveling relay 45 which moves to its upper or closed position responsively to its energization. In the upper or closed position of this relay, the movable contact member is disengaged from the lower stationary contact thereby interrupting the energizing circuit for contactor 80 which drops to its lower position responsively to the deenergization of its operating coil to interrupt the short circuit about the resistance section 21. The short circuit about resistance section 21 being interrupted, the excitation of the generator 14 is further decreased and likewise the speed of the traction motor 11 is correspondingly decreased. The car is now traveling at an intermediate leveling speed of approximately 125 feet per minute. It should be noted that in its upper or closed position, the up leveling relay 45 completes an additional holding circuit for the operating coil of up directional contactor 19 independently of the holding circuit that is established by relay 118; this additional holding circuit being readily traced from the positive side 17 of the supply source through conductor 82, upper contacts of up leveling relay 45 conductor 103 and thence by conductor 104, lower contact of relay 105 and conductor 106 to and through the operating coil of contactor 19 and from thence through the coil of brake relay 106' and conductor 107 to the negative side 18 of the supply source.

When the car 10 is approximately fourteen inches from the fifth floor the plate and grid coils 66 and 67 of electric discharge device 62 come into cooperative relationship with metallic vane member 75, i. e., the vane 75 interrupts the inductive relationship between these coils and as a result the plate current of this electric discharge device ceases to oscillate and becomes a direct current of sufficiently increased magnitude to energize the operating coil of low speed leveling relay 47, the movable contact member of which moves to its upper position in response to the energization of its operating coil. The movable contact member of low speed leveling relay 47 is disengaged from its cooperating lower stationary contacts and the energizing circuit for relay 118 is interrupted, as a result of which relay 118 opens to interrupt the holding circuit for the operating coil of up directional contactor 19 previously established through its upper contact; the contactor still remaining energized and closed, however, due to the additional holding circuit established by up-leveling relay 45. When the contact of low speed leveling relay 47 engages its upper cooperating contacts, it establishes an energizing circuit for contactor 140 from the positive side 17 of the supply source through conductor 77, upper contacts of relays 78 and 47 conductor 141, coil of contactor 140, conductor 137, intermediate contact of brake relay 106' and thence by conductor 107 to the negative side 18 of the supply source. Contactor 140 opens in response to its energization to disconnect one terminal of the accelerating resistance section 20 from the positive side 17 of the supply source thereby removing resistance section 20 from in parallel with resistance sections 21 and 22 thereby further decreasing the excitation of the generator 14 and reducing the speed of the traction motor 11 to a predetermined low leveling speed of approximately 20 feet per minute.

When the floor of the car 10 is level with the fifth landing, the plate and grid coils 52 and 53 of electric discharge device 48' pass out of cooperative relationship with the metallic vane member 75 as a result of which the inductive relationship between these coils is reestablished and the plate current of electric discharge device 48' again becomes oscillating and of such decreased magnitude as to result in the deenergization of the operating coil of up leveling relay 45 which immediately drops to its lower position responsively to the deenergization of the coil. Since the holding circuit of the operating coil of up directional contactor 19 passes through the upper contact of up directional relay 45, this holding circuit is interrupted when the relay opens and the up directional contactor 19 drops to the open position in which it is illustrated in the drawing to interrupt the circuit for the field winding 16 of generator 14 and the operating coil of brake relay 106' connected in series relationship with the operating coil of up directional contactor 19 is also deenergized. The brake relay being deenergized, drops to the open position illustrated in the drawing to interrupt the energizing circuit for the solenoid brake 48, thereby permitting the brake spring to set the shoe against the drum and bring the traction motor 11 to rest.

Since the circuit for relay 113 and contactors 115 and 140 are completed through the intermediate contact of brake relay 106 these circuits are interrupted when relay 106' is deenergized and opened, and as a result, relay 113 and contactors 115 and 140 descend under the attraction of gravity to the positions in which they are shown in the drawing and the apparatus is again in its normal or prestarting position.

Should the elevator car 10 not be leveled at the land, but proceed a short distance above the landing the plate and grid coils 59 and 60 of down leveling discharge device 55 will come into cooperative relationship with the metallic vane member 75 and the vane will interrupt the inductive relationship between the coils thereby rendering the plate current of electric discharge device 55 nonoscillating and of sufficiently increased magnitude to energize the operating coil of the down leveling relay 46, the movable contact member of which is operated into engagement with a separate cooperating stationary contact to complete and energizing circuit for the operating coil of the down directional contactor 9 which circuit is traced from the positive side 17 of the supply source through conductor 82, upper contact of down leveling relay 46, conductors 142 and 143, lower contact of relay 95 (previously deenergized and opened when the segment $17_a$ of the car switch was centered by the operator in response to the warning signal), interlocking contacts of up directional contactor 19, operating coil of down directional contactor 9, operating coil of brake relay 106' and thence by conductor 107 to the negative side 18 of the supply source. As a result of the energization of the brake relay 106' the brake shoe is again withdrawn, against the tension of its spring, from engagement with the brake shoe and the closing operation of the down directional contactor 9 connects the field winding 15 of generator 14 to the supply source 17, 18 over a circuit that will readily be traceable from the description previously given in connection with the closing of up directional contactor 19. Current will flow through the field winding 16 in the opposite direction however and it will be of low value due to the large amount of resistance in circuit with the field winding as a result of which the traction motor 11 will rotate at slow speed in the opposite direction to return the car 10 to the landing. When the floor of the car 10 is again level with the fifth landing, the coils 59 and 60 of down leveling electric discharge device 55 will pass out of cooperative relationship with the metallic vane member 75 and the inductive relationship between these coils will be restored and the plate current of this device will again become oscillating and of such decreased magnitude as to result in the deenergization of down leveling relay 46 which drops to its lower position to interrupt the energizing circuit for the operating coil of down directional contactor 9 and brake relay 106' thereby interrupting the circuit of the generator field winding 16 thereby to stop the motor as previously described, and permitting the brake spring to set the brake shoe against the brake drum.

If the next landing for which a button has been depressed to stop the car in its upward travel is but two floors away, the starting and stopping operations of the car will be exactly the same as previously described for the high speed operation with the exception that the motor 11 will not be accelerated to full running speed before the automatic deceleration is initiated because the contact segment $27_b$ will engage the two floor run contact associated with the vertical segment 32 for the floor for which a button has been depressed before the accelerating contactor 123 can close to accelerate the motor to full speed. Consequently when contact segment $27_b$ engages a two floor run contact the relay 131 will be energized through the middle finger $39_b$ of the transfer switch 39 and the automatic deceleration and leveling operation will be initiated at this point and these operations will be identical with those previously described for the high speed operation with the sole exception as noted, that the traction motor is prevented from accelerating to full running speed before the deceleration is initiated.

Similarly if the next floor for which a button has been depressed to stop the car is but one floor away from that at which the car is standing, the speed of the traction motor 11 will be limited to a still lower value before the automatic deceleration is initiated because shortly after the car 10 leaves the floor at which it is standing, the contact section $27_c$ engages the one floor contact associated with the vertical segment 33 and corresponding to the next floor (one floor away) for which a button has been depressed to stop the car and the relay 130 is energized through the right hand blade $39_c$ of the transfer switch and this relay in responding to its energization operates the accelerating contactor 115 to its open position in the manner previously described so as to prevent the resistance section 24 from being added in parallel to the resistance sections 20, 22 and 25 thereby limiting the speed of the traction motor to a predetermined low value; and the lower contact of the relay 130 in its closed position energizes the warning gong 75' which, as previously, admonishes the operator to actuate the segment $17_a$ of the car switch to the central or off position. Contactor 115 in opening prevents contactor 123 from closing (since the energizing circuit for the latter must pass through the lower contact of contactor 115 in the closed position) and since contactor 123 cannot be closed, resistance sections 20 to 25 inclusive can not be short circuited and as a result the speed of the traction motor 11 is limited to a predetermined low value which is approximately 300 feet per minute. From this point on, the speed of the traction motor is decelerated and the car is leveled at the landing in the previously described manner.

The motion of the car 10 can be stopped and reversed at any point of its travel by operating the movable segment 17a of the car switch from its full speed operative position in one direction to its full speed operative position in the reverse direction. As the segment 17a is operated to the first point in the reverse direction, the energizing circuit for which ever of the interlocking control relays 95 or 105 has previously been closed is interrupted and the energizing circuit for the other of these relays is completed so that the other of these relays operates to the closed position to interrupt the holding circuit for the directional contactor which is established by relay 118 and as a result the car is decelerated and brought to rest and started in the opposite direction in a manner that will be clear from the previous description of the starting operation.

If the automatic stop cut off switch 94 is opened the circuits established through the signal registering machine 26 can not be established to initiate the automatic deceleration and the car will operate simply as a leveling elevator. It will also be clear that if the leveling cut out switch 76 is also opened that the electric discharge devices 48', 55 and 62 will be deenergized and the car will operate simply as a car switch controlled elevator. On the other hand if the automatic stop cut off switch 94 is closed and the leveling cut out switch 76 is opened, deceleration of the traction motor will be initiated automatically in response to the depression of push buttons corresponding to the floors at which it is desired to stop the car, but the leveling operation will be entirely under the control of the car switch.

Since the operating coil of leveling protective relay 78 is connected in series with the filament circuit of the leveling electric discharge devices, it functions in the event of failure of the filament circuit to interrupt all the circuits previously traced through the contacts of this relay and thus to make all the circuit changes necessary for operating without the automatic retard and leveling.

Although in accordance with the provisions of the patents statutes I have described this invention as embodied in concrete form, I would have it understood that the exact elements and connections described and shown in the drawing are merely illustrative and that the invention is by no means limited thereto since alterations and modifications will readily suggest themselves to persons skilled in the art without departing from the true spirit of this invention or from the scope of the annexed claims.

What I claim as new and desire to secure by Letters Patent of the United States, is:

1. In an elevator system, the combination with a motor for raising and lowering of the car, of means for varying the speed of said motor, a control device, means controlled by said control device comprising an electric circuit and an electric discharge device included in said circuit for controlling said speed varying means to reduce the speed of said motor to a predetermined low value when the car is a predetermined distance from a desired landing and to stop said motor when said car is level with said landing, and means controlled by said control device comprising a second electric circuit including a second electric discharge device for controlling said speed varying means to reduce the speed of said motor to a still lower value in the interval between said speed reducing and stopping operations of said first mentioned electric discharge device.

2. In an elevator system the combination with a motor for raising and lowering the car, of means for varying the speed of said motor, a control device, means controlled by said control device comprising an electric circuit including an electric discharge device for operating said speed varying means as the car approaches a desired landing in either direction to reduce the speed of said motor to a predetermined low value, means controlled by said control device comprising a second electric circuit including a second electric discharge device for actuating said speed varying means in the up direction of travel of the car to stop said motor when the car is level with said landing, and means comprising a third electric circuit including a third electric discharge device controlled by said control device in the down direction of travel of said car for actuating said speed varying means to stop said motor when said car is level with said landing.

3. In an elevator system, the combination with a motor for raising and lowering the car, of means for varying the speed of said motor, means for actuating said speed varying means comprising a pair of electric circuits each including an electric discharge device, and means for selectively actuating said discharge devices depending upon the direction of approach of the car to a desired landing to control said speed varying means to reduce the speed of said motor to a predetermined low value when the car is a predetermined distance from said landing and to stop said motor when said car is level with said landing.

4. In an elevator system the combination with a motor for raising and lowering the car, of means for varying the speed of said motor, a control device, a pair of electric circuits each including an electric discharge device arranged to be selectively energized by said control device to actuate said speed varying means to reduce the speed of said motor to a predetermined low value responsively to the approach of the car to a desired landing from opposite directions respectively and to stop said motor when said car is level with said landing, and a third circuit including an electric discharge device arranged to be energized by said control device in the interval between the speed reducing and stopping operations of said pair of electric discharge devices to further reduce the speed of said motor independently of the direction of travel of the car.

5. In an elevator system, the combination with a motor for raising and lowering the car, of means comprising an electric discharge device for controlling said motor for one direction of travel and a second electric discharge device for controlling said motor for the opposite direction of travel, a pair of control devices, one for each of said discharge devices, a control member arranged for cooperation with said control devices, means providing relative movement between said control member and control devices in accordance with the movement of the car, and means mounting said control devices in spaced apart relationship such that when the car is within a predetermined distance in either direction from a predetermined landing a corresponding one of said discharge devices is activated to cause said motor to move the car toward said landing at low speed and when the car is level with said landing both discharge devices are rendered inactive to effect stopping of said motor.

6. In an elevator system, the combination with an electric motor for raising and lowering the car, of a pair of electric discharge devices for controlling said motor, a pair of control devices one for each of said discharge devices, a control member arranged for cooperation with said control devices to control said discharge devices, means providing relative movement between said member and said control devices in accordance with the travel of the car, means mounting said control devices in spaced apart relationship such that when the car is within a predetermined distance either side of a predetermined landing one of said discharge devices is activated to cause said motor to move the car toward said landing at low speed and when said car is level with said landing both discharge devices are rendered inactive and said motor is stopped, a third electric discharge device for further reducing the speed of the motor irrespectively of the direction of travel of the car and a third control device arranged in the space between said pair of control devices and in alignment therewith so as to cooperate with said control member to activate said third discharge device when the car is within a predetermined distance of said landing less than said first mentioned distance.

7. In an elevator system, the combination with a car and a motor for raising and lowering said car, a pair of electric discharge devices operable when separately activated to effect operation of said motor in respectively opposite directions and when both are inactive to stop said motor, a third electric discharge device operable when activated to reduce the speed of said motor, a metallic vane arranged in the elevator shaft, a plurality of pairs of coils one pair for each of said devices, the separate coils of each of said pairs being included in the input and output circuits respectively of the associated discharge device and arranged for cooperation with said vane and means mounting said pairs of coils in vertical alignment on said car and in a spaced apart relationship such that when said car is within a predetermined distance either side of said landing said vane and one of said pairs of coils cooperate to activate one of said pair of discharge devices, and when said car is a lesser distance from said landing said vane and a second pair of said coils cooperate to activate said third discharge device, and when the car is level with said landing said pair of discharge devices is rendered inactive.

8. In an elevator system, the combination with a motor for raising and lowering the car, of a contactor for controlling the operation of said motor, an energizing circuit for said contactor, a manually operated car switch for establishing and interrupting said circuit, and an electric discharge device controlled in accordance with the position of the car and an electroresponsive device controlled thereby for reducing the speed of said motor when the car is a predetermined distance from a desired landing and for establishing a holding circuit for said contactor independently of said car switch until the car is level with said landing and for interrupting said holding circuit to stop said motor when the car is level with said landing.

9. In an elevator system, the combination with a motor for raising and lowering the car, of up and down directional contactors, energizing circuits for said contactors, a manually operated car switch for establishing and interrupting said circuits, a pair of electric discharge devices for respectively establishing locking circuits for said contactors independently of said car switch and for effecting operation of said motor at re- said inductive devices for selectively activating said discharge devices to establish said locking circuits and effect operation of said motor at low speed when the car is within a predetermined distance either side of a predetermined landing and for controlling said discharge devices to interrupt the circuits for both of said contactors when the car is level with said landing.

10. In an elevator system, the combination with a motor for raising and lowering the car, of up and down directional contactors for controlling said motor, a car switch for controlling said contactors, a pair of electric discharge devices and electroresponsive means controlled thereby and operable in response to selective actuation of said discharge devices for selectively establishing holding circuits for said contactors independently of said car switch and for reducing the speed of said motor, and operable when both of said discharge devices are inactive to interrupt said holding circuits to stop said motor, a third electric discharge device and electroresponsive means responsive to actuation of said third discharge device for further reducing the speed of said motor, separate inductive devices for controlling said discharge devices and a single metallic vane arranged to cooperate with said inductive devices for selectively actuating said pair of discharge devices when the car is a predetermined distance either side of a predetermined landing and actuating said third discharge device when the car is a lesser distance from said landing, and for rendering both of said pair of discharge devices inactive when the car is level with said landing.

11. In an elevator system, the combination with a motor for raising and lowering the car of a pair of directional contactors for controlling said motor, a manually operated car switch for controlling said motor, a manually operated car switch for controlling said contactors, a pair of electric discharge devices each having a pair of inductively related coils in circuit therewith and electroresponsive means controlled by said devices responsively to selective interruption of the inductive relationship of said pairs of coils for selectively establishing holding circuits for said contactors independently of said car switch and for reducing the speed of said motor, a third electric discharge device having a pair of inductively related coils in circuit therewith and electroresponsive means controlled thereby in response to interruption of the inductive relationship between said pair of coils for further reducing the speed of said motor, and a metallic vane member arranged to cooperate with said pairs of coils for selectively interrupting the inductive relationship of the pairs of coils for said pair of discharge devices when the car is a predetermined distance either side of a predetermined landing and for interrupting the inductive relationship between the pair of coils for said third discharge device when the car is a lesser distance from said landing and irrespectively of its direction from said landing.

12. In an elevator system, the combination with a motor for driving the car, of a contactor for controlling the operation of said motor, an energizing circuit for said contactor, a manually operated car switch for establishing and interrupting said circuit, an electric discharge device for establishing a holding circuit for said contactor independently of said car switch when the car is within a predetermined distance of a desired landing and for interrupting said holding circuit when said car is level with said landing, means for maintaining said holding circuit while the speed of said motor is above a predetermined value, and means responsive to an operation of said car switch for interrupting said holding circuit.

13. In an elevator system, the combination with a motor for driving the car, of a contactor for controlling the operation of said motor, an energizing circuit for said contactor, a manually operated car switch having an off position and operable to an operative position to establish said circuit, an electric discharge device for establishin~ a holding circuit for said contactor independently of said car switch when the car is within a predetermined distance from a desired landing and for interrupting said holding circuit when the car is level with said landing, means for maintaining said holding circuit established while the speed of said motor is above a predetermined value, and a relay responsive to operation of said car switch to a second operative position for interrupting said holding circuit.

14. In an elevator system, the combination with a motor for driving the car, of a contactor for controlling the operation of said motor, an energizing circuit for said contactor, a manually operated car switch having an off position to establish said circuit, an electric discharge device for establishing a holding circuit for said contactor independently of said car switch with said car switch in said off position at all times during the travel of the car except when the car is beyond a predetermined distance from a desired landing, a second electric discharge device for maintaining said holding circuit when the car is within said distance from said landing and for interrupting said holding circuit when the car is level with said landing, a relay responsive to the counter voltage of the motor for preventing the interruption of said holding circuit while the speed of the motor is above a predetermined value and a relay responsive to operation of said car switch to a second operative position for interrupting said holding circuit.

15. In an elevator system, a motor for raising and lowering the car, a pair of directional contactors for controlling the direction of rotation of said motor; respective energizing circuits for said contactors, a manually operated car switch operable to respective operative positions for respectively establishing said circuits and operable to an off position to interrupt said circuits, an electric discharge device for establishing a holding circuit for said contactors with said car switch in said off position at all times during the travel of the car except when the car is within a predetermined distance either side of a desired landing, a pair of electric discharge devices for respectively maintaining said holding circuit when the car is on respectively opposite sides of said landing within said distance and for interrupting said holding circuits when the car is level with said landing, a relay responsive to the counter voltage of said motor for preventing the interruption of said circuit while the speed of the car is above a predetermined value, and a pair of relays respectively responsive to operation of said car switch in respectively opposite directions from said off position to interrupt said holding circuit.

16. In an elevator system, the combination with a motor for driving the car, of means for controlling the speed of said motor, a manually operated car switch operable to an operative position for actuating said speed controlling means to start said motor and operable to an off position for actuating said speed controlling means to stop said motor, means comprising a plurality of control contacts one for each floor and a movable contact cooperating therewith and actuated in accordance with the movement of the car with said switch in said operative position for actuating said speed controlling means to initiate deceleration of said motor when the car is a predetermined distance from a desired landing, a plurality of metallic vanes, one for each floor, electric discharge apparatus controlled by said vane to actuate said speed controlling means for further reducing the speed of said motor to a predetermined low leveling speed when the car is a lesser predetermined distance from said landing and for stopping said motor when the car is level with said landing, and electrical connections controlled by said car switch in its off position for rendering said discharge apparatus effective.

17. In an elevator system, the combination with a traction motor for driving the car, of means for controlling the speed of said motor, a manually operated car switch operable to an operative position for actuating said speed controlling means to start said motor and to an off position for actuating said speed controlling means to stop said motor, a plurality of manually controlled contact devices, one for each floor and a member movable in accordance with the movement of the car and cooperating with said contact devices for actuating said speed controlling means to initiate deceleration of said motor when the car is a predetermined distance from a desired landing, an inductive electric circuit including electric discharge apparatus a plurality of vanes, one for each floor, means providing relative movement of said vanes and said circuit to energize said electric discharge apparatus, means responsive to energization of said electric discharge apparatus to actuate said speed controlling means for further reducing the speed of said motor to a predetermined low leveling speed and for stopping said motor when the car is level with said landing, and electrical connections requiring the operation of said car switch to off position to render said electric discharge apparatus effective.

18. In an elevator system, the combination with a motor for driving the car, of means for controlling the speed of said motor, a manually operated car switch having an off position and an operative position, a plurality of contact devices one for each landing, and a contact member movable in accordance with the movement of the car and cooperating with said contact devices to actuate said speed controlling means to initiate deceleration of said motor when the car is a predetermined distance from a desired landing, an electric circuit including an electric discharge device for controlling said speed controlling means, said circuit being controlled jointly by the position of the car and the speed of said motor for energizing said electric discharge device further reducing the motor speed to a predetermined low leveling speed when the car is a lesser predetermined distance from said landing and for stopping said motor when the car is level with said landing, and electrical connections established only in the off position of said car switch for rendering said discharge device effective.

In witness whereof, I have hereunto set my hand.

JOHN EATON.

CERTIFICATE OF CORRECTION.

Patent No. 1,910,204. May 23, 1933.

JOHN EATON.

It is hereby certified that error appears in the printed specification of the above numbered patent requiring correction as follows: Page 3, line 59, for "intiate" read "initiate"; page 8, line 95, before "the" insert the word "to"; page 11, line 17, for "and" read "an"; page 12, line 69, claim 1, strike out the word "of"; page 13, line 125, claim 9, for "said inductive devices" read "duced speed, and means"; and that the said Letters Patent should be read with these corrections therein that the same may conform to the record of the case in the Patent Office.

Signed and sealed this 8th day of August, A. D. 1933.

M. J. Moore.

(Seal) Acting Commissioner of Patents.